(12) United States Patent
Corbin, III et al.

(10) Patent No.: US 11,515,757 B2
(45) Date of Patent: Nov. 29, 2022

(54) MAGNETIC DRIVE HAVING A LIQUID-COOLED HIGH TORGUE AND HIGH-POWER APPARATUS

(71) Applicant: Flux Drive LLC, Wilmington, DE (US)

(72) Inventors: Philip Corbin, III, Renton, WA (US); Richard Braun, Port Angeles, WA (US); Michael Troy Sparks, Bothell, WA (US)

(73) Assignee: Flux Drive, LLC, Kent, WA (US)

( * ) Notice: Subject to any disclaimer, the term of this patent is extended or adjusted under 35 U.S.C. 154(b) by 112 days.

(21) Appl. No.: 16/909,989

(22) Filed: Jun. 23, 2020

(65) Prior Publication Data
US 2020/0395820 A1   Dec. 17, 2020

Related U.S. Application Data

(63) Continuation-in-part of application No. 29/673,720, filed on Dec. 17, 2018, now Pat. No. Des. 888,119.

(51) Int. Cl.
| | |
|---|---|
| *H02K 9/19* | (2006.01) |
| *H02K 49/10* | (2006.01) |
| *H02K 49/06* | (2006.01) |
| *H02K 9/20* | (2006.01) |

(52) U.S. Cl.
CPC ............ *H02K 9/19* (2013.01); *H02K 49/108* (2013.01); *H02K 9/20* (2013.01); *H02K 49/06* (2013.01); *H02K 49/104* (2013.01)

(58) Field of Classification Search
CPC ............ H02K 9/19; H02K 9/20; H02K 49/00; H02K 49/06; H02K 49/10; H02K 49/104; H02K 49/108
USPC ......................................... 310/52, 54, 58, 64
See application file for complete search history.

(56) References Cited

U.S. PATENT DOCUMENTS

| | | | |
|---|---|---|---|
| 2013/0313928 A1* | 11/2013 | McKinzie | H02K 9/00 310/54 |
| 2014/0042841 A1* | 2/2014 | Rippel | H02K 5/203 310/54 |
| 2015/0280525 A1* | 10/2015 | Rippel | H02K 5/203 310/54 |
| 2020/0381984 A1* | 12/2020 | Sercombe | H02P 25/16 |
| 2021/0344256 A1* | 11/2021 | Kummeth | H01F 27/36 |

* cited by examiner

*Primary Examiner* — Rashad H Johnson
(74) *Attorney, Agent, or Firm* — The Miller Law Offices PLC; Steven J. Miller, Esq.

(57) ABSTRACT

An improved liquid cooled apparatus for transferring large torques magnetically with a primary rotary member and a secondary rotary member as is set forth in U.S. Pat. No. 7,294,947. The primary rotary member has permanent magnets, the secondary rotary member with electro-conductive materials. Both of said rotors being encased in a liquid tight casing enclosure and said rotors both being liquid cooled to allow for power transfers in excess of 260 KW and 1000 ft.lb torque.

1 Claim, 4 Drawing Sheets

MAGNETIC DRIVE HAVING A LIQUID-COOLED HIGH TORGUE AND HIGH-POWER APPARATUS

CROSS REFERENCE TO RELATED APPLICATIONS

This application is a continuation-in-part of U.S. application Ser. No. 29/673,720 filed on Dec. 17, 2018.

STATEMENT REGARDING FEDERALLY SPONSORED RESEARCH OR DEVELOPMENT

Not Applicable.

DESCRIPTION OF ATTACHED APPENDIX

Not Applicable.

BACKGROUND OF THE INVENTION

The present invention relates to an improvement over the prior art more particularly set forth in U.S. Pat. No. 7,294,947, said U.S. Pat. No. 7,294,947 being incorporated herein by reference, and its related patents in other jurisdictions, wherein, said prior art was directed to a rotational magnetic torque transfer device utilizing two coaxial cylinders overlapping one another wherein one cylinder contains a row(s) of permanent magnets and the other cylinder contains a ring(s) of electroconductive material, but the problem was that said prior art had a maximum power transfer limit since the induction rotor bars were atmospherically air cooled, said air cooling causing both the induction rotor bars and magnetic circuit materials to reach a temperature that would break down the magnetic characteristics of the materials above a certain power transfer rating point. The challenge is to develop a modified geometric arrangement and structure for the device that would allow for direct liquid injection cooling within said coaxial cylinders without increasing magnetic circuit reluctance or electrical conductor short circuits within said device. The prior art was limited to less than 1000 KW power transfer, otherwise the internal operating temperature of the unit would cause the permanent magnets' field to fail.

It is desirable to devise a liquid cooled permanent magnet excited mechanism for transmitting variable torque in drive applications. Specifically, there is a need to couple constant speed devices such as motors or engines to high power variable output speed and torque devices such as pump impellers, fans, propellers, wheels, etc. As set forth in the prior U.S. Pat. No. 7,294,947, this devices specific individual electroconductive rotor bar geometry together with the analogous matched permanent magnets similar geometry placed directly opposite said rotor electro-conductive bars taken together create a torque transfer device that is not a traditional eddy current device, Eddy current devices produce circular-like eddy currents in relatively wide electro-conductive materials. The improvement over the U.S. Pat. No. 7,294,947 device's specific narrow rotor electroconductive rotor bars and narrow cross-section permanent magnets rests in devising a way to maintain this non-eddy current rotor bar efficiency, but yet develop a way to quickly remove the high heat generated a high power transfers in said electro-conductive bars, in a manner that will maintain the prior art's (U.S. Pat. No. 7,294,947) efficient magnetic circuit.

The invention discloses and claims improvements that allow very large power transfers through direct liquid injection into the electroconductive bars, then said liquid exiting directly and impinging upon the magnetic bar rotor, said liquid not interfering with the permeability of the magnetic field or magnetic circuit.

The described apparatus is a device that uses permanent magnets and conductors arranged in an optimal manner to generate the magnetic flux in a power transmission drive, together with direct liquid injection for both rotors cooling. The embodiments described utilize a mechanical means for changing the flux density between two rotating components to vary the torque transmitted by and thereby the output speed of the apparatus.

BRIEF SUMMARY OF THE INVENTION

As was disclosed in the prior art U.S. Pat. No. 729,947, the present invention utilizes permanent magnets to transmit variable or fixed torque between two rotating elements. The aforesaid permanent magnets are located on only one of the two rotating elements (also referred to as "rotors" or "rotary members"), and the other rotating element in a particular embodiment does not contain permanent magnets but does have so-called "electro-conductive" elements. In addition, so-called "magnetically permeable" materials are also contained on the said non-permanent magnet rotors, said magnetically permeable materials comprising substances that allow magnetic flux penetration. The torque between the aforesaid two rotating elements is adjusted by varying the amount of magnetic flux passing between the elements by varying the extent to which the elements are axially overlapped. In a preferred embodiment of the apparatus, two concentric cylinders, one containing one or more rows of permanent magnets, is moved axially in order to progressively axially overlap a second cylindrical element containing electro-conductive elements and magnetically permeable elements, but not containing permanent magnets. This progressive axial overlapping of the two cylinders allows variation in the amount of magnetic flux intersecting the two concentric cylinders. This causes the amount of induced electrical current in the cylinder containing the electro-conductive elements to vary, which then causes the induced counter magnetic forces to vary. The magnetic forces and, thus, torque transmitted will vary based on the amount of axial overlap.

Said prior art was only air cooled by atmospheric air existing around the two rotors. The electro-conductive rotor has induced current that increases as the relative angular velocity difference between the two rotors increases; said current generating heat, thereby limited the unit to transferring approximately 260 KW (at 1,000 ft-lb torque). Therefore, in order to transfer thousands of kilowatts of power, a liquid cooling system was devised wherein said cooling liquid would travel extremely close to the current-carrying/heat-generating surface of the electro-conductive rotor bar, and wherein the amount of liquid flow through each rotor bar could be adjusted with threaded end plugs at the end of each electro-conductive rotor bar cooling liquid channel. Further, in order to cool the surface of the magnet rotors which run very close to the inductive rotor bars through a very narrow gap, when said cooling liquid gets to said flow adjusting screw plug, the liquid coolant is directed radially to the magnet rotor so that the liquid coolant directly impinges upon the surface of the magnet bars. The proposed invention overcomes previous limitation of the invention disclosed in U.S. Pat. No. 7,294,947 in that there is no limit to the amount of power that the device can transfer limited only by the structural strength of the various materials. There is no longer any limitation due to the heat generated in the electro-conductive bars in the electro-conductive rotor. The liquid coolant does not interfere with the magnetic field circuit magnetic flux flow nor does said coolant allow internal short circuits for the components in and around the electro-conductive elements. Further the induction rotor rotation itself acts as a second centrifugal boost pump to assist in circulating the liquid coolant. In order to properly regulate the amount of liquid coolant flow needed for proper cooling, and not permit excessive liquid cooling flow which would reduce the net power transfer efficiency of the unit, the new geometry of the new liquid cooled induction rotor has adjusting screw plugs at the end of each electro-conductive rotor bar (504).

The proposed invention overcomes previous limitations by taking advantage of new technologies in magnet materials and provides a stable means of mechanically varying large amounts of transmitted torque without the need for large external current controls.

BRIEF DESCRIPTION OF THE SEVERAL VIEWS OF THE DRAWING

The drawings constitute a part of this specification and include exemplary embodiments to the invention, which may be embodied in various forms. It is to be understood that in some instances various aspects of the invention may be shown exaggerated or enlarged to facilitate an understanding of the invention.

Description of selected embodiments of the invention included herein are listed as follows.

DETAILED DESCRIPTION OF THE INVENTION

Detailed descriptions of preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
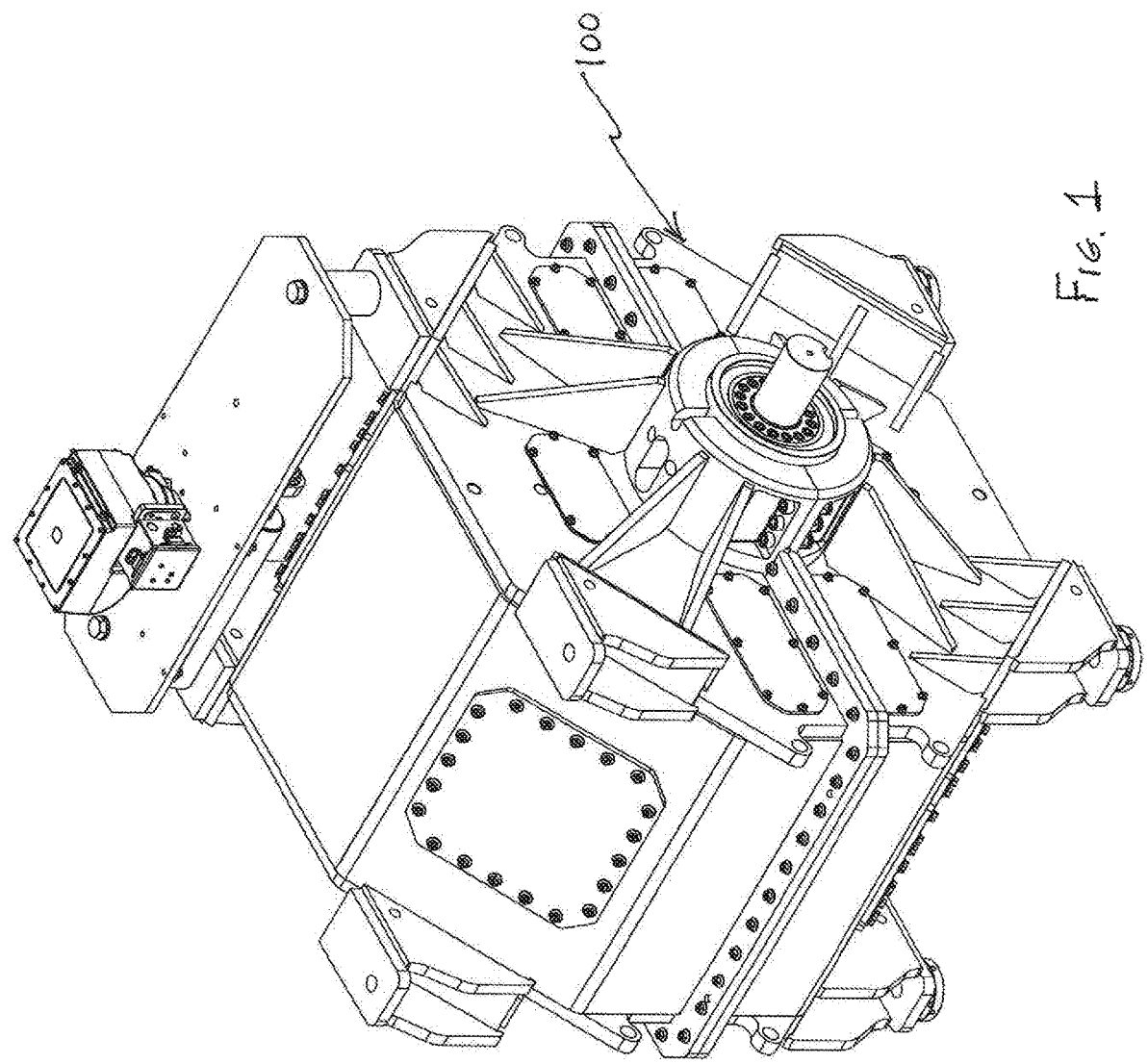
FIG. 1 is an isometric view of the exterior of a preferred embodiment of the invention.
Figure 2:
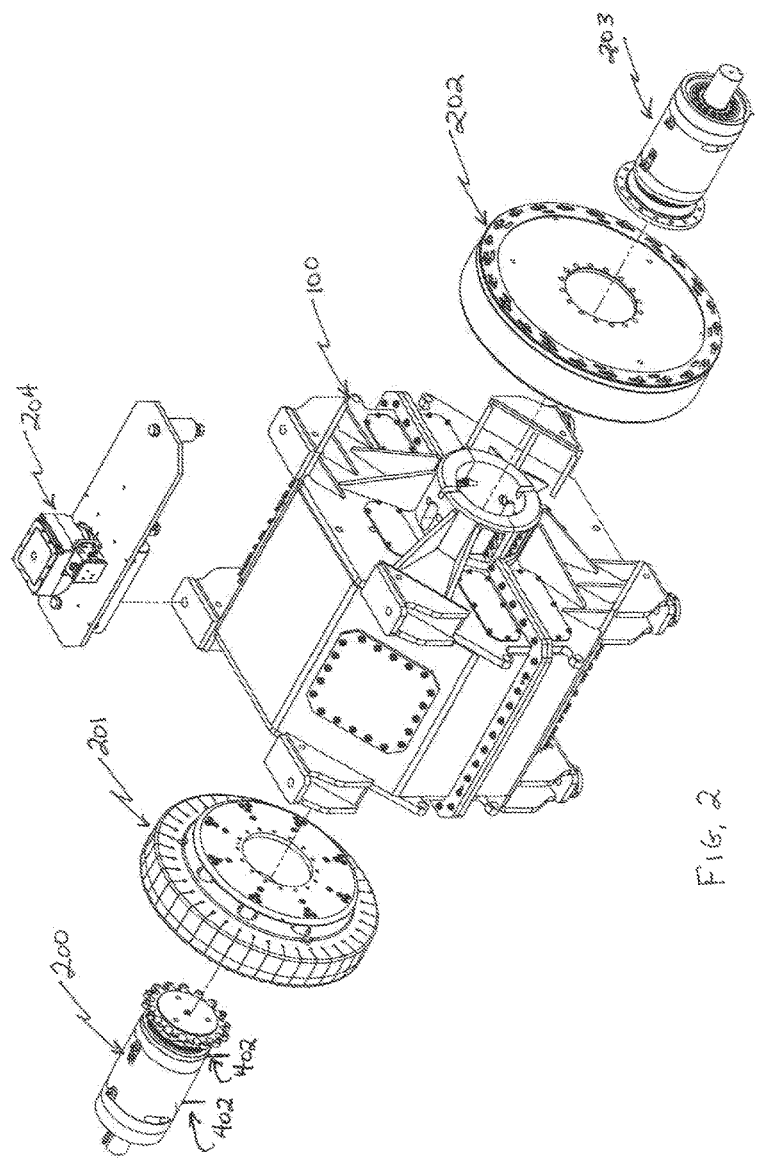
FIG. 2 is an exploded isometric view of FIG. 1.
Figure 3:
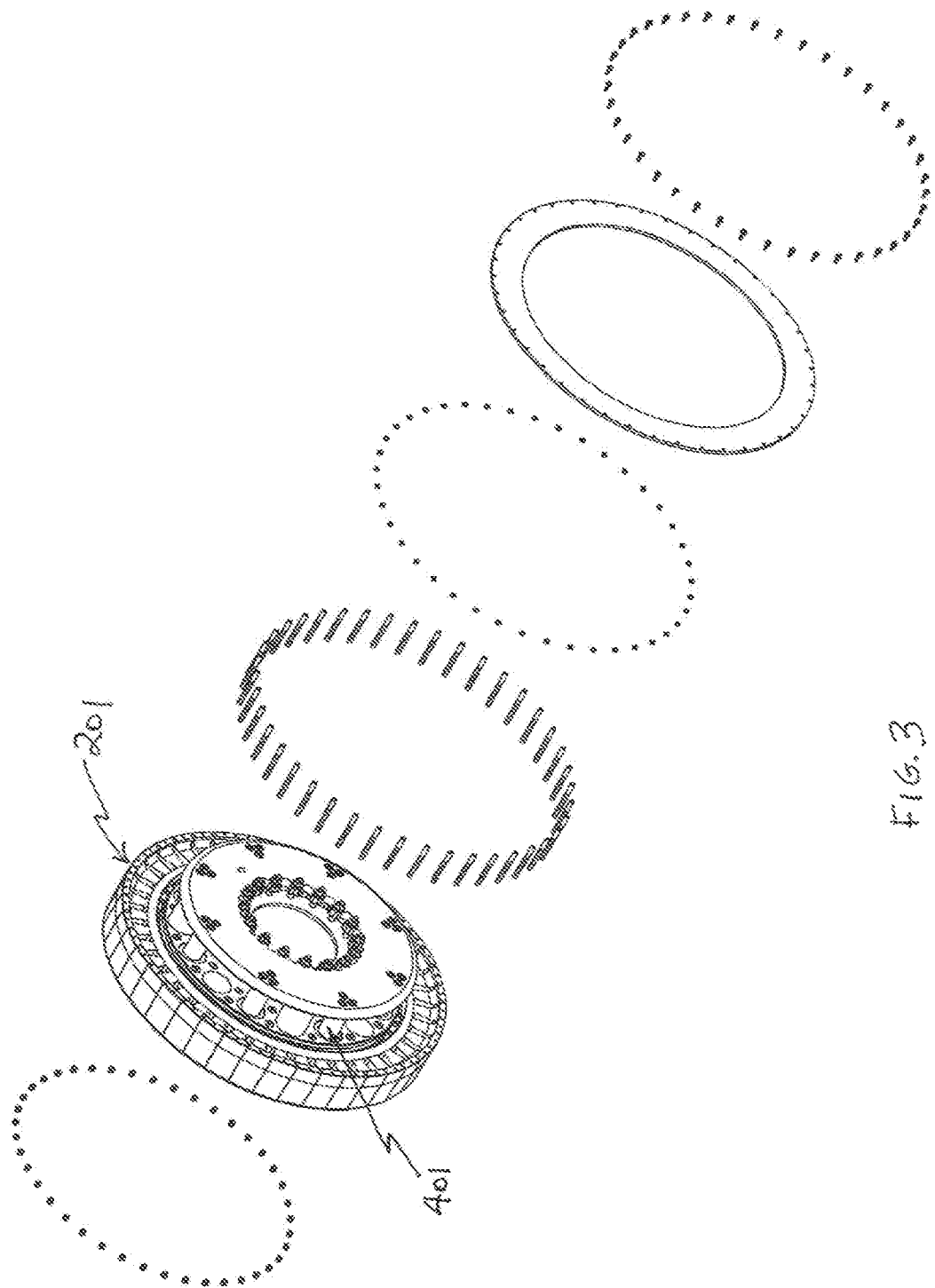
FIG. 3 is an exploded isometric view of the liquid-cooled electro-conductive rotor of the preferred embodiment of the invention.
Figure 4:
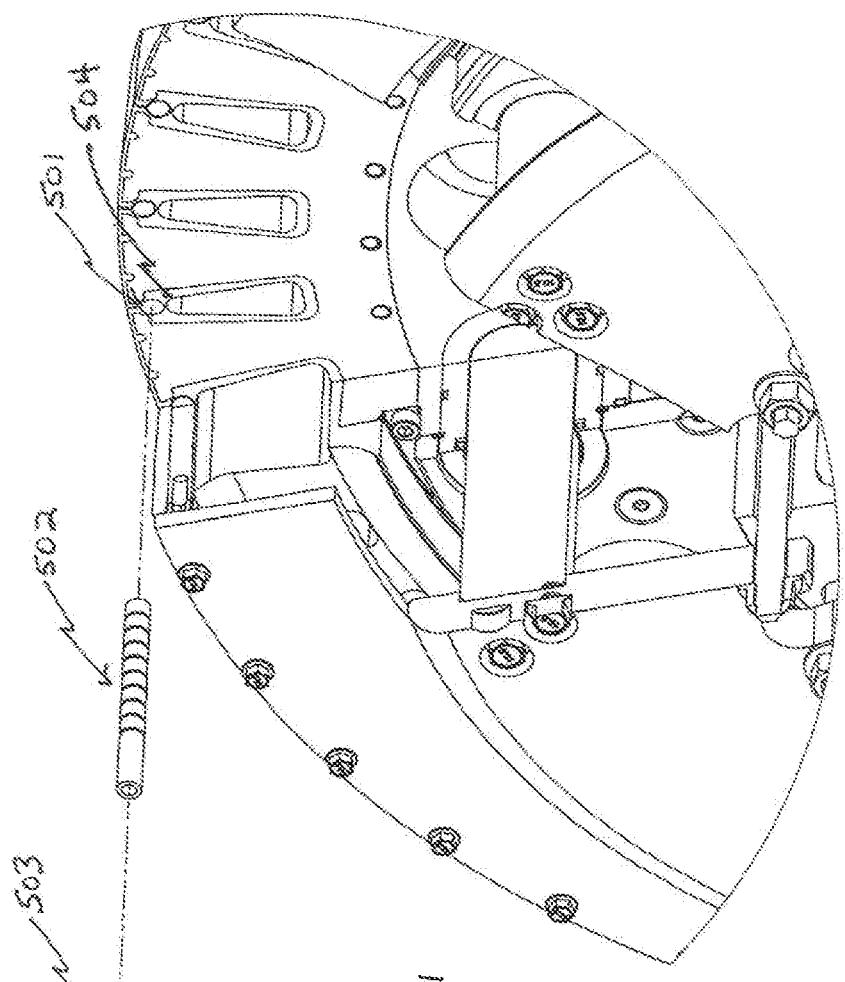
FIG. 4 is an isometric view of the liquid-cooled electro-conductive rotor.
Figure 5:
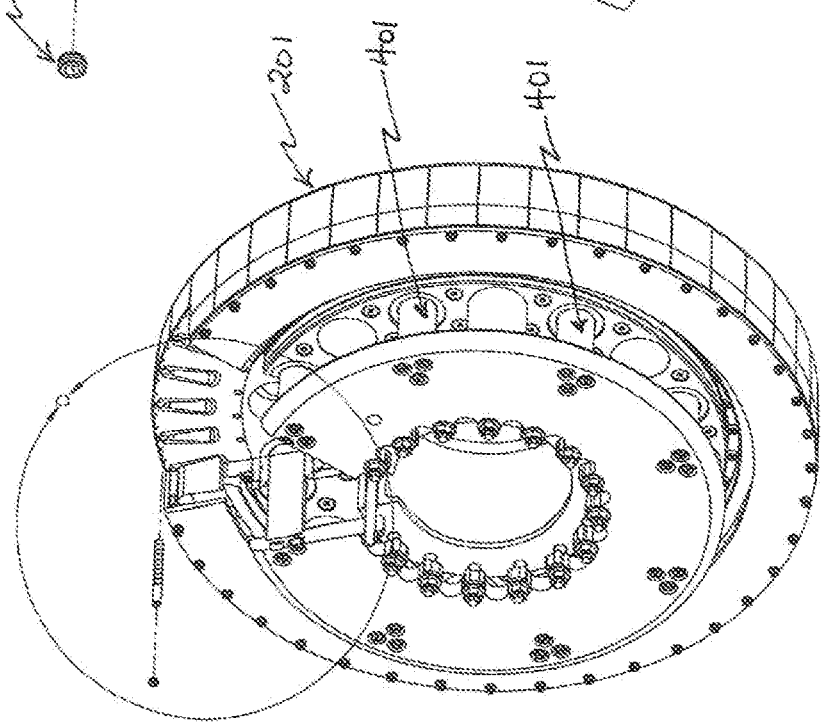
FIG. 5 is an isometric view of the detail of the channels for cooling liquid flow immediately adjacent to and running parallel along the electroconductive rotor bars of FIG. 4.

Referring to FIG. 1 though FIG. 5, the preferred embodiment of the invention is shown and described as it applies to a liquid cooled high power variable speed drive application. The two coaxial rotors [one rotor having axially placed electro-conductive bars (201) and one rotor having one axially placed permanent magnet bars (202)] together with their respective support bearing cartridge systems (200 and 203) are shown in an exploded view outside of their casing (100). Also, shown is the automatic control system actuator (204) which moves one of the two rotors relative to one another to adjust the axial overlap of the two rotors while they are rotating to vary the amount of torque and power transferred through the unit. The embodiment casing (100) when assembled is fully liquid-tight so as to capture the cooling liquid that is pumped through the cooling liquid passages (501) located directly adjacent to the electro-conductive rotor bars (504). The bearing support cartridges (200 and 203) are oil lubricated and cooled and are sealed from the outside and from the casing so that the oil and the rotor cooling liquid do not intermix. The purpose of using magnetically permeable material is to provide a continuous magnetic flux path between the magnetic pole faces, thereby allowing optimum magnetic flux arrangements to exist. The magnetically permeable material need not be ferromagnetic.

The cooling system is a closed system consisting of an external liquid storage tank, a centrifugal circulating pump, a heat exchanger to reject the heat picked up in the magnetic drive unit, temperature gages, pressure gages, filters, and interconnecting piping. The cooling liquid may consist of a mixture of distilled water and a glycol compound.

Said prior art was only air cooled by atmospheric air existing around the two rotors. The electro-conductive rotor has induced current that increases as the relative angular velocity difference between the two rotors increases; said current generating heat, thereby limited the unit to transferring approximately 260 KW (at 1,000 ft-lb torque). Therefore, in order to transfer thousands of kilowatts of power, a liquid cooling system was devised wherein said cooling liquid would travel extremely close to the current-carrying/heat-generating surface of the electro-conductive rotor bar, and wherein the amount of liquid flow through each rotor bar could be adjusted with threaded end plugs at the end of each electro-conductive rotor bar cooling liquid channel (502 and 503). Further, in order to cool the surface of the magnet rotors which run very close to the inductive rotor bars through a very narrow gap, when said cooling liquid gets to said flow adjusting screw plug (503), the liquid coolant is directed radially to the magnet rotor so that the liquid coolant directly impinges upon the surface of the magnet bars. The proposed invention overcomes previous limitation of the invention disclosed in U.S. Pat. No. 7,294,947 in that there is no limit to the amount of power that the device can transfer limited only by the structural strength of the various materials. There is no longer any limitation due to the heat generated in the electro-conductive bars in the electro-conductive rotor. The liquid coolant does not interfere with the magnetic field circuit magnetic flux flow nor does said coolant allow internal short circuits for the components in and around the electro-conductive elements. Further the induction rotor rotation itself acts as a second centrifugal boost pump to assist in circulating the liquid coolant. In order to properly regulate the amount of liquid coolant flow needed for proper cooling, and not permit excessive liquid cooling flow which would reduce the net power transfer efficiency of the unit, the new geometry of the new liquid cooled induction rotor has adjusting screw plugs (502 and 503) at the end of each electro-conductive rotor bar (504).

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A liquid-cooled high torque and high-power apparatus for transferring torque magnetically comprising:

a primary rotary member and a secondary rotary member; the primary rotary member axially overlapping said secondary rotary member; the secondary rotary member being surrounded by said primary member; the primary rotary member having permanent magnets mounted on it; the secondary rotary member having electro-conductive elements and magnetically permeable materials, and not having permanent magnets; said electro-conductive elements being cooled by liquid coolant running in axial liquid cooling channels immediately adjacent to, and parallel to, the electro-conductive bars of the electro-conductive rotor, said liquid coolant flow being further adjustable to optimize the required liquid flow for best apparatus efficiency, said cooling liquid being delivered to the apparatus by a closed liquid cooling system with an external storage tank, external pump, external heat exchanger to reject the heat generated in the electro-conductive bars, said secondary rotary member axially overlapped by said primary rotating member wherein a means for varying said primary rotary member's axial position relative to said secondary rotating member is provided; and said primary rotating member being connected to and driven by a torque producing device and said secondary rotating member being connected to a torque utilizing device whereby rotation of the primary rotary member causes rotation of said secondary rotating member by some or all of the magnetic flux emanating from said permanent magnets mounted on said primary rotating member cutting through the electro-conductive material on said secondary rotary member thereby generating torque and rotation in said secondary rotary member in relation to the percentage of the total area that said secondary rotary member is axially overlapped by said primary rotary member, and said permanent magnets being cooled by direct liquid coolant impingement emanating from the ends of the liquid cooling channels located immediately adjacent to the the secondary rotary member rotor bars.

* * * * *